Figure 1:
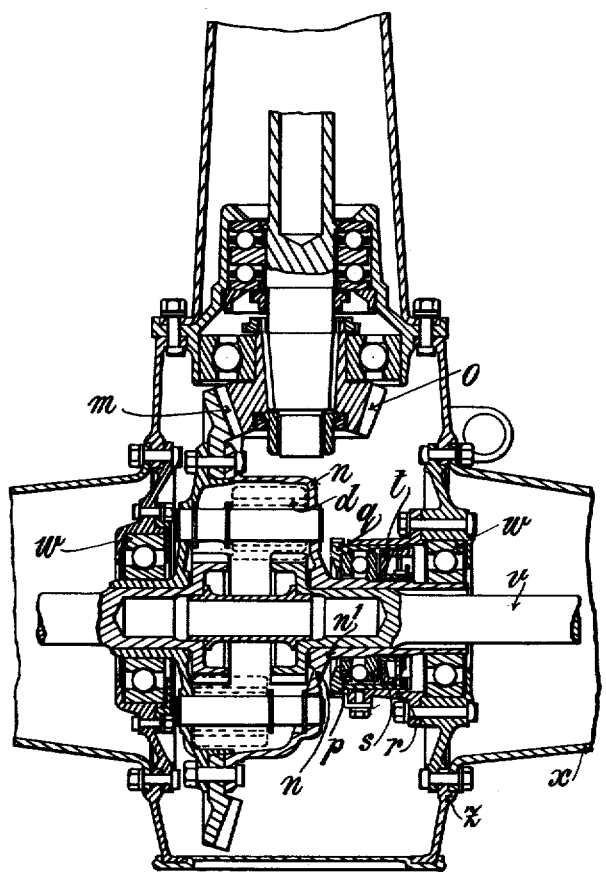

F. H. ROYCE.
TRANSMISSION GEARING.
APPLICATION FILED OCT. 27, 1911.

1,023,683.

Patented Apr. 16, 1912.
2 SHEETS—SHEET 1.

WITNESSES

INVENTOR
F. H. Royce.
Attorney.

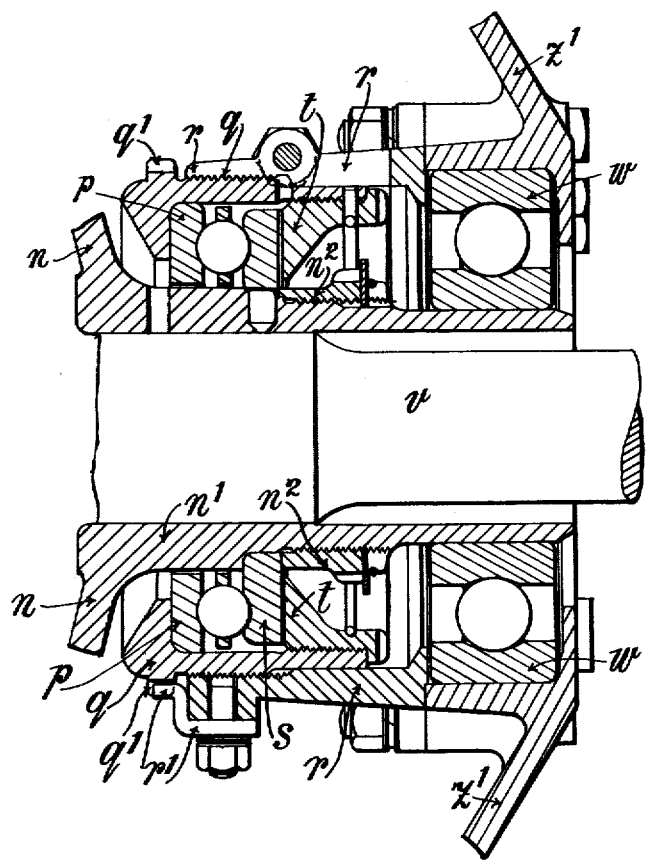

UNITED STATES PATENT OFFICE.

FREDERICK HENRY ROYCE, OF DERBY, ENGLAND.

TRANSMISSION-GEARING.

1,023,683.  Specification of Letters Patent.  Patented Apr. 16, 1912.

Application filed October 27, 1911. Serial No. 657,155.

*To all whom it may concern:*

Be it known that I, FREDERICK HENRY ROYCE, a subject of the King of Great Britain and Ireland, residing at Nightingale Road, Osmaston Road, Derby, in the county of Derby, England, have invented certain new and useful Improvements in Transmission-Gearing for Motor Road-Vehicles, of which the following is a specification, reference being had therein to the accompanying drawing.

This invention relates to that type of transmission gearing for motor road vehicles in which the road wheels are mounted on a fixed tubular axle within which the driving axles run, and in which the drive from the propeller shaft to the driving axles is through bevel gearing, and particularly to that type in which provision is made for adjusting the position of the bevel wheel in relation to the bevel pinion for the purpose of correctly setting the meshing of the teeth of said wheels, and it has for its object obtaining said adjustment in either direction by a single operation and in a more simple and convenient manner than has hitherto been possible. I attain this end by combining with the bearing adapted to take the thrust of the bevel wheel a second surface or bearing adapted to retain the bevel wheel in an axial direction opposite to the thrust and by mounting the combined bearings in a housing which is capable of adjustment in either direction axially in relation to the fixed axle or casing.

In the accompanying drawing which shows one method of carrying this invention into practice:—Figure 1 is a broken view in plan—partly in section—illustrating this invention, and Fig. 2 is an enlarged view thereof.

In both views similar parts are marked with like letters of reference.

The cage $n$ carrying the differential gearing $d$ is as usual mounted over the inner ends of the two-part driving axle $v$ and is supported in bearings $w$ carried by the box or case $z$ within which the bevel driving gearing $m$ $o$ and differential gearing $d$ are located, the cage $n$ being capable of sliding axially relatively to the inner races of the said main bearing carrying with it the differential gearing bevel wheel and two parts of the driving axle, said parts being free to move axially and relatively to the road wheels by means of the usual sliding driving jaws or keys arranged in the hubs of said road wheels. The one part $p$ of the thrust bearing is mounted in a sleeve or housing $q$ which is adjustably mounted by means of a screw-thread in a sleeve-like extension $r$ formed on or carried by the interior $z^1$ of the box $z$, said sleeve or housing being capable of being locked to the sleeve-like part $r$ of the axle box $z$ by means of any suitable locking device such as the finger $r^1$ which is mounted on the sleeve $q$. The other part $s$ of the thrust bearing is mounted on the boss $n^1$ of the differential cage so that it revolves with it, said cage being kept in position thereon by a ring $n^2$ threaded on the sleeve $n^1$ and locked thereto by any suitable locking device. Abutting against the back or outer face of the part $s$ of the thrust bearing is a collar $t$ which is adjustably mounted in the interior of the sleeve $q$.

In order to adjust the beveled toothed wheel $m$ longitudinally on the shaft $v$, the locking finger $r^1$ is first removed, and the screw threaded housing $q$ is then revolved in the screwthreaded sleeve $r$, so as to move the two opposed thrust-bearing members $p$ and $s$ to the right or to the left, as required, thereby sliding the cage $n$ together with the differential gearing inclosed in it and the beveled toothed wheel $m$. The housing $q$ is revolved by hand or by any suitable wrench applied to the teeth $q^1$.

What I claim is:

1. The combination with a support or casing provided with bearings and having a screwthreaded sleeve, a cage for the differential gearing mounted in the said bearings, and a beveled toothed wheel secured to the said cage; of a revoluble screwthreaded housing engaging with the said screwthreaded sleeve, a thrust-bearing carried by the said housing and having one of its parts connected to the said cage, and a locking device which normally prevents the housing from being revolved in the said sleeve.

2. The combination, with a support or casing provided with bearings and having a screwthreaded sleeve, a cage for the differential gearing mounted in the said bearings and provided with a hub, and a beveled toothed wheel secured to the said cage; of a revoluble screwthreaded housing engaging with the screwthreaded sleeve, a thrust-bearing carried by the said housing, a ring screwed on the said hub and securing one of the thrust-bearing members to the said cage, and a locking device which normally prevents the housing from being revolved in the said sleeve.

In testimony whereof I have signed my name in the presence of two subscribing witnesses.

FREDERICK HENRY ROYCE.

Witnesses:
C. K. EDDOWES,
JOHN DELOOZE.